(12) United States Patent
Owen et al.

(10) Patent No.: US 7,473,412 B2
(45) Date of Patent: Jan. 6, 2009

(54) PROCESS FOR THE PURIFICATION OF AQUEOUS PEROXYGEN SOLUTIONS, SOLUTIONS OBTAINABLE THEREBY AND THEIR USE

(75) Inventors: Robert Owen, Brussels (BE); Juergen Bosse, Neustadt am Rbge (DE); Michael Sell, Peine (DE)

(73) Assignee: Solvay (Société Anonyme), Brussels (BE)

( * ) Notice: Subject to any disclaimer, the term of this patent is extended or adjusted under 35 U.S.C. 154(b) by 0 days.

(21) Appl. No.: 10/574,289

(22) PCT Filed: Oct. 1, 2004

(86) PCT No.: PCT/EP2004/052400

§ 371 (c)(1),
(2), (4) Date: Jan. 16, 2007

(87) PCT Pub. No.: WO2005/033005

PCT Pub. Date: Apr. 14, 2005

(65) Prior Publication Data

US 2007/0095755 A1 May 3, 2007

Related U.S. Application Data

(60) Provisional application No. 60/509,264, filed on Oct. 8, 2003.

(30) Foreign Application Priority Data

Oct. 2, 2003 (EP) .................................. 03103657

(51) Int. Cl.
*C01B 15/013* (2006.01)

(52) U.S. Cl. ....................... 423/584; 210/652; 210/653; 210/654

(58) Field of Classification Search ................. 423/584; 210/652, 653, 654

See application file for complete search history.

(56) References Cited

U.S. PATENT DOCUMENTS

| 2,368,640 | A | * | 2/1945 | Cook | .......................... | 423/584 |
|---|---|---|---|---|---|---|
| 4,879,043 | A | * | 11/1989 | Boughton et al. | ........... | 210/651 |
| 5,614,165 | A | * | 3/1997 | Sugihara et al. | ............. | 423/584 |
| 5,624,655 | A | * | 4/1997 | Inaba et al. | ................. | 423/584 |
| 5,733,521 | A | * | 3/1998 | Minamikawa et al. | ...... | 423/584 |
| 5,851,402 | A | * | 12/1998 | Dhalluin et al. | ............. | 210/651 |
| 6,540,921 | B1 | * | 4/2003 | Devos et al. | ................ | 210/660 |
| 6,592,840 | B1 | * | 7/2003 | Fischer et al. | ............... | 423/584 |
| 2002/0012626 | A1 | * | 1/2002 | Tanaka et al. | ............... | 423/584 |

(Continued)

FOREIGN PATENT DOCUMENTS

EP        0 930 269        7/1999

(Continued)

*Primary Examiner*—Wayne Langel
(74) *Attorney, Agent, or Firm*—Oblon, Spivak, McClelland, Maier & Neustadt, P.C.

(57) ABSTRACT

Process for the purification of aqueous peroxygen solutions comprising the treatment of an aqueous peroxygen solution with (a) at least one membrane purification step, (b) optionally at least one ion exchange purification step, (c) optionally at least one dilution step, and (d) at least one other purification step, all of which can be conducted in any sequence. Aqueous peroxygen solutions having a TOC level of less than 1 mg/kg can be obtained by this process. They can be used in the manufacture of semiconductors.

21 Claims, 1 Drawing Sheet

U.S. PATENT DOCUMENTS

2002/0015676 A1 * 2/2002 Tanaka et al. ............... 423/584
2003/0165420 A1 * 9/2003 Oeter et al. ................. 423/584

FOREIGN PATENT DOCUMENTS

| | | |
|---|---|---|
| EP | 1 167 290 | 1/2002 |
| JP | 09-071404 | 3/1997 |
| JP | 09-071405 | 3/1997 |
| JP | 2003-001070 | 1/2003 |

* cited by examiner

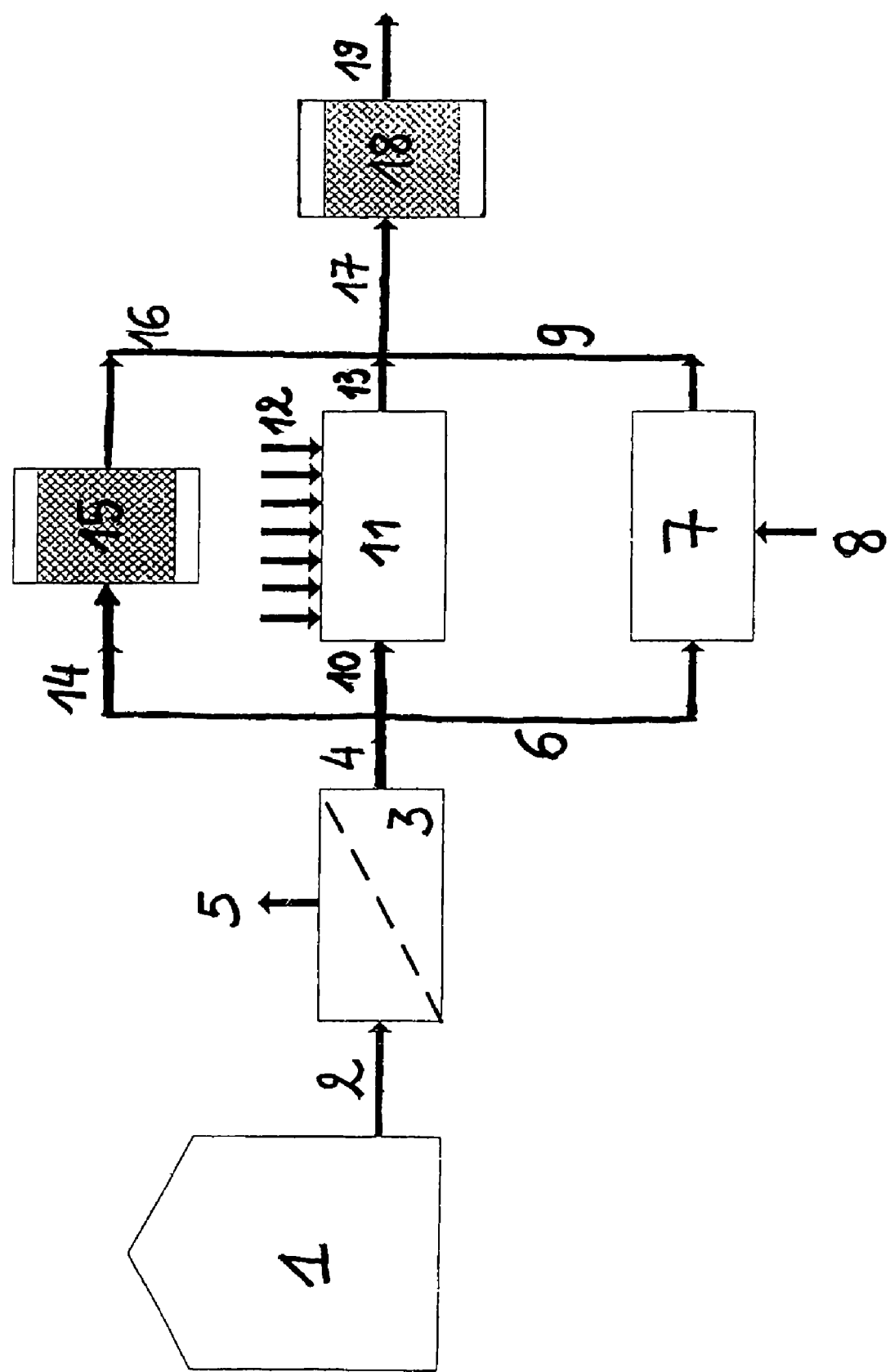

PROCESS FOR THE PURIFICATION OF AQUEOUS PEROXYGEN SOLUTIONS, SOLUTIONS OBTAINABLE THEREBY AND THEIR USE

CROSS-REFERENCE TO RELATED APPLICATIONS

The present application claims the benefit of provisional U.S. application Ser. No. 60/509,264, filed Oct. 8, 2003 and EP patent application no. 03103657.7, filed Oct. 2, 2003, both herein incorporated by reference.

BACKGROUND OF THE INVENTION

The present invention relates to a process for the purification of aqueous peroxygen solutions, in particular hydrogen peroxide solutions, especially those having concentrations of hydrogen peroxide between 5 and 70% by weight, and particularly for the removal of organic contaminants to levels which can be below 1 mg Total Organic Carbon (TOC) per kg of solution.

DESCRIPTION OF THE RELATED ART

Most of the aqueous hydrogen peroxide solutions are currently made by the autoxidation technique. Typically an alkyl substituted anthraquinone is subjected cyclically to reduction with hydrogen, oxidation in air and extraction of hydrogen peroxide with water. Many variations of this manufacturing technique are known. After formation, the aqueous hydrogen peroxide can be purified to some extent by distillation techniques. Although the manufacturing techniques differ markedly in their operation they share the common result that a solution of hydrogen peroxide so formed, even after distillation, contains significant amounts of residual impurities, ionic and non-ionic. Typical cationic impurities include (but not limited to) iron, aluminium, sodium, calcium, zinc, magnesium and nickel. Typical anionic impurities include nitrate, phosphate, and pyrophosphate. In addition the nature of the autoxidation process is such that the resulting hydrogen peroxide solution contains significant organic impurities typically at concentrations above 50 mg/kg and occasionally as high as 600 mg/kg.

Aqueous hydrogen peroxide is an important raw material for the semiconductor and microelectronics industries. It is used in many of the processing steps that result in the finished semiconductor or component. The industry demands a high level of purity from the hydrogen peroxide solutions. Cationic and anionic contamination of the semiconductor process result in lowered production yields and therefore higher costs. In addition it is known that trace levels of organic contamination can influence the semiconductor production processes. Thus the contaminant levels present in aqueous hydrogen peroxide produced from the autoxidation process are unacceptably high and further purification is required to produce a semiconductor grade material.

EP 0930269A1 refers to a purification process whereby a reverse osmosis membrane is used to remove the bulk of contaminating species from hydrogen peroxide prior to treatment with ion exchange resins for final polishing. In this case the permeate from the reverse osmosis operation can have a Total Organic Carbon (TOC) content of 6 ppm.

U.S. Pat. No. 4,879,043 refers also to the use of a reverse osmosis process producing a permeate of 17.4 ppm TOC.

The DERWENT® abstract of JP 2003001070 teaches that the reverse osmosis process could produce a TOC level of less than 3 ppm in a hydrogen peroxide solution.

The DERWENT® abstracts of JP 09071404 and JP 09071405 describe the use of ozone and ultraviolet light to achieve reduction of TOC content.

SUMMARY OF THE INVENTION

Those skilled in the art will note that it is difficult to reduce TOC levels below 1 mg/kg when challenged with hydrogen peroxide and especially with hydrogen peroxide produced by the autoxidation process.

The object of this invention is thus to present a means for producing a hydrogen peroxide solution having a TOC level less than 1 mg/kg and preferably less than 0.01 mg/kg which is close to the level expected by the semiconductor industry for ultrapure water which is used extensively in the semiconductor production process.

To this effect, the present invention is related to a process for the purification of aqueous peroxygen solutions comprising the treatment of an aqueous peroxygen solution with (a) at least one membrane purification step, (b) optionally at least one ion exchange purification step, (c) optionally at least one dilution step, and (d) at least one other purification step, all of which can be conducted in any sequence.

The present invention is also related to aqueous peroxygen solutions obtainable by the said process and containing less than 1 mg of TOC per kg peroxygen solution.

DESCRIPTION OF THE INVENTION

One of the essential characteristics of the present invention resides in the combination of at least one membrane purification step with at least one other purification step which is different from an ion exchange purification step and from a dilution step. By doing so, it has indeed been possible to eliminate a high amount of the contaminants present in peroxygen solutions. These contaminants can for instance result from the production process of the peroxygen. In the case of the autoxidation process for the production of hydrogen peroxide, the contaminants can be organic hydrocarbon compounds containing functional groups such as alcohols, aldehydes and carboxylic acids as well as alkylated aromatics. Di isobutyl carbinol would be a typical alcohol and tetra methyl benzene would be a typical alkylated aromatic. It has been possible to decrease the content of organic impurities to amounts lower than 1 mg TOC per kg of peroxygen solution, in particular to amounts lower than 0.1 mg TOC per kg peroxygen solution. In the best cases, the TOC level can be lowered to values of less than 0.01 mg TOC per kg of peroxygen solution.

The other purification step is different from an ion exchange purification step and from a dilution step. It can for instance be chosen from exposure to ultraviolet light, exposure to ozone, contact with at least one adsorption resin or any combination thereof. Exposure to ultraviolet light, and consecutive exposure to ultraviolet light and contact with at least one adsorption resin give good results. Consecutive exposure to ultraviolet light and then contact with at least one adsorption resin is preferred.

According to the process of the present invention, the other purification step can be carried out before or after the membrane purification step. It is preferred to carry out the other purification step after the membrane purification step.

The term "membrane purification step" is intended to denote any treatment which allows the reduction of contaminant level in a peroxygen solution by the formation of a purer permeate. Generally, a flow of the contaminated peroxygen solution passes through the membrane and the solution collected after passing through is purified. Membrane purification can for instance be carried out as explained in the patent application EP 0930269.

The flux of the permeate peroxygen solution generally depends on the nature of the membrane, of the thickness of the membrane, of the purification level desired, and the applied pressure. The flux is usually at least 20 liters per hour and per $m^2$ of membrane surface, in particular at least 25 l/h $m^2$. The flux is in many cases at most 50 l/h $m^2$, especially at most 30 l/h $m^2$.

The membrane used in the process of the invention is preferably chosen to be a reverse osmosis membrane. This membrane can be made of polyamides, polypiperazine amides, polyacrylonitriles or polysulfones.

When the other purification step is an exposure to ultraviolet (UV) light, the peroxygen solution is exposed to UV light. Without being bound to any theoretical explanation, it is believed that the UV light destroys certain organic molecules present in the solution and breaks them down to smaller units and in some cases to carbon dioxide. Any source of UV light can be use. UV lamps give the best results. The wavelength of the UV light used is generally below 300 nm, in particular below 200 nm. Wavelengths of about 185 nm are very convenient.

During the exposure to UV light, the peroxygen solution is contacted with the surface of the UV source, especially with the surface of the UV lamp. It is recommended to maximise the contact of the peroxygen solution with the UV lamp. An arrangement which is particularly useful is placement of the UV lamp in a quartz sleeve which forms the inner surface of an annulus through which the hydrogen peroxide solution flows.

Usually the duration of the exposure of the peroxygen solution to UV light is at least 1 minute, in particular at least 5 minutes. The duration is usually at most 90 minutes, in most cases at most 60 minutes, for instance 30 minutes.

The exposure to UV light is generally carried out at a temperature from 0 to 25° C., in particular from 5 to 20° C., temperatures of about 10° C. being convenient.

When the other purification step is an exposure to ozone, the peroxygen solution is contacted with ozone in any adequate way to maximise the contact of the solution with the ozone. Without being bound to any theoretical explanation, it is believed that ozone oxidizes some contaminant molecules present in the peroxygen solution so that they are broken down to smaller units and ultimately to carbon dioxide, which is eliminated by providing sufficient residence time for disengagement which also allows the removal of excess ozone.

The exposure to ozone can be achieved by blowing gaseous ozone, under pressure, into the peroxygen solution so that ozone bubbles pass through the solution. The amount of ozone must be at least 2 moles for every mole of carbon atoms present as organic carbon. However, typically the addition rate is in excess of this stoichiometric ratio but is limited by the solubility of ozone in the hydrogen peroxide solution. The duration of the exposure to ozone is generally at least 10 minutes, in particular at least 15 minutes. It is usually at most 30 minutes, especially at most 45 minutes.

The exposure to ozone is usually carried out at a temperature from 0 to 30° C., in particular from 5 to 20° C., temperatures of about 10° C. being convenient.

When the other purification step is a contact with an adsorption resin, it is recommended to use a resin with a surface as high as possible. The purpose is to adsorb contaminants present in the peroxygen solution on the surface of the resin which is in contact with the peroxygen solution, so that the peroxygen solution leaving the contact equipment no longer contains the adsorbed contaminants. A suitable equipment can for instance be a column packed with a bed of adsorption resin particles.

The adsorption resins can be chosen from any polymeric product, for example based on a styrene divinyl benzene copolymer. The adsorption resin AMBERLITE® XAD4 commercialized by the company ROHM & HAAS gives good results.

The time during which the peroxygen solution is contacted with the adsorption resin is generally at least 10 minutes, in particular at least 40 minutes. It is in many cases at most 60 minutes, especially at most 50 minutes.

The contact with the adsorption resin is usually carried out at a temperature from 0 to 25° C., in particular from 5 to 20° C., temperatures of about 15° C. being convenient.

The peroxygen solution which is subjected to the purification process of the invention generally contains at least 5% by weight of peroxygen, in particular at least 30% by weight of peroxygen, more particularly at least 55%. The amount of peroxygen is usually at most 70% by weight, especially at most 65% by weight. Concentrations from 5 to 70% by weight of peroxygen are the most common.

The peroxygen used in the present invention can be chosen from hydrogen peroxide, water soluble peracids, and any other water soluble molecule containing a peroxygen group of formula —O—O—. Hydrogen peroxide is preferred. It is possible to treat hydrogen peroxide produced by the autoxidation process or by direct synthesis from oxygen and hydrogen. The process of the invention is especially useful for treating hydrogen peroxide solutions prepared by the autoxidation process. In this case, the hydrogen peroxide solution is preferably subjected to a distillation treatment before being subjected to the process of the invention. The hydrogen peroxide solution used in the process of the invention can also contain stabilisers and/or additives such as nitrates, phosphates, pyrophosphates, phosphoric acid, nitric acid or any combination thereof.

The process of the invention can also contain at least one ion exchange purification step. In such a step, the peroxygen solution is contacted with an ion exchange resin so that ionic impurities present in the peroxygen solution are replaced by the counterion such as $H^+$ or $HCO_3^-$ present in the resin. Suitable equipment can for instance be a column packed with a bed of ion exchange resin particles, or same resins held within a matrix to form a membrane.

The ion exchange resin can be chosen from a variety of types. However for optimal removal of anionic TOC components an anion exchange resin in the bicarbonate form is preferred.

The process of the invention can also contain at least one dilution step. In such a step, water, preferably ultrapure water, is added to the aqueous peroxygen solution in order to decrease its concentration in peroxygen. Usually, the concentration in peroxygen is lowered down to values between 30 to 40% by weight, for instance to a value of about 34% by weight.

According to a special realisation form of the process of the invention, the treatment comprises, in the following sequence, (1) a membrane purification step, (2) a purification step chosen from exposure to ultraviolet light and/or exposure to ozone, (3) a dilution step, (4) an optional contact with an adsorption resin, (5) an optional ion exchange purification step. Advantageously, the process of the invention can additionally contain (6) a second optional ion exchange purification step, and (7) a purification step chosen from exposure to ultraviolet light and/or exposure to ozone.

In a particular realization which achieves high purity levels, the process of the invention is carried out according to the one schematized in the figure. According to this particular process, an aqueous peroxygen solution, especially a hydrogen peroxide solution, preferably at a concentration of 55 to 65% by weight (for instance about 60% by weight), is pumped from a storage tank (1) via the conduit (2) into a housing (3) containing a membrane element, which is preferably a reverse osmosis membrane. A portion of the peroxygen solution passed through the membrane emerges as permeate via the conduit (4), the remainder passes across the membrane and leaves the housing (3) as reject material via the conduit (5). The permeate peroxygen solution has already a reduced TOC level. It is processed by additional steps to further reduce the TOC level, such as an exposure to ozone in the first variant, or an exposure to UV light in the second variant, or a contact with an adsorption resin in the third variant. According to the first variant (exposure to ozone), the permeate peroxygen solution is transferred via the conduits (4) and (6) into a suitable container (7). Gaseous ozone is introduced into the container (7) via the conduit (8). The gaseous ozone is bubbled through the peroxygen solution. The treated hydrogen peroxide leaves the container (7) via the conduit (9). According to the second variant (exposure to UV light), the permeate peroxygen solution is transferred via the conduits (4) and (10) into a housing (11) wherein it is exposed to UV light (12) preferably with a wavelength of about 185 nm. The treated peroxygen solution leaves the housing (11) via the conduit (13). According to the third variant (contact with an adsorption resin), the permeate peroxygen solution is transferred via the conduits (4) and (14) into a column (15) containing an adsorption resin. The treated peroxygen solution leaves the column (15) via the conduit (16). In all three variants, the treated peroxygen solution can optionally be transferred via the conduit (17) to a column (18) containing an ion exchange resin. The peroxygen solution passes through this resin and leaves the column (18) via the conduit (19) as final purified product, which can have a TOC level of as low as 0.01 mg/kg. It is to he understood that two of the three variants can be combined or the three variants can be combined.

The process of the invention allows to obtain purified aqueous peroxygen solutions containing less than 1 mg of Total Organic Carbon (TOC) per kg peroxygen solution. The present invention is therefore also related to aqueous peroxygen solutions obtainable by the process described above and containing less than 1 mg of Total Organic Carbon (TOC) per kg peroxygen solution. The TOC is measured by catalytic oxidation of the organic species in combination with detection by non-dispersive infra red spectroscopy.

The aqueous peroxygen solutions according to the invention contain advantageously less than 0,1 mg TOC per kg peroxygen solution, in particular less than 0.01 mg TOC per kg of peroxygen solution.

The aqueous peroxygen solutions according to the invention can be used in the manufacture of microelectronic components and semiconductors. The invention is therefore also related to the use of the aqueous peroxygen solutions in the manufacture of microelectronic components and semiconductors.

The invention is illustrated in the following examples.

EXAMPLE 1

According to the Invention

An aqueous solution of hydrogen peroxide at a concentration of 60% by weight was fed to a reverse osmosis membrane at a temperature of 25° C. A Hydranautics SWC1 membrane was used. At a feed pressure of 20 barg, a permeate flow of 600 l/h was collected from a total feed flowrate of 850 l/h. The TOC value of the feed was 65 ppm, the resulting permeate contained 1.7 ppm. The permeate was then diluted to a concentration of 32% using ultrapure water (having a TOC level of less than 1 ppb) and passed through a column of a Rohm & Haas XAD4 adsorption resin with a residence time of 20 min at a temperature of 15° C. The resulting hydrogen peroxide solution had a TOC level of 0.78 ppm.

EXAMPLE 2

According to the Invention

The aqueous hydrogen peroxide solution produced in example 1 was then passed through a cation exchange resin (Rohm & Haas A200) with a residence time of 20 min at 5° C. and then through an anion exchange resin from Rohm & Haas in bicarbonate form with a residence time of 5 min at 5° C. and the TOC had further reduced to 0.49 ppm.

The invention claimed is:

1. A process for the purification of an aqueous hydrogen peroxide solution comprising the treatment of an aqueous hydrogen peroxide solution first with a reverse osmosis membrane purification, and afterwards with at least one other purification selected from the group consisting of exposure to ultraviolet light, exposure to ozone, contact with at least one adsorption resin, and any combination thereof.

2. The process according to claim 1, wherein the hydrogen peroxide solution has a concentration before treatment of 5 to 70% by weight of hydrogen peroxide.

3. The process according to claim 1, wherein the other purification includes exposure to ultraviolet light.

4. The process according to claim 1, wherein the treatment comprises, in the following sequence, (1) the reverse osmosis membrane purification, (2) a purification selected from the group consisting of exposure to ultraviolet light, exposure to ozone and a combination thereof, (3) a dilution, (4) an optional contact with an adsorption resin, (5) an optional ion exchange purification.

5. The process according to claim 4, wherein the treatment additionally comprises (6) a second optional ion exchange purification, and (7) a second purification selected from the group consisting of exposure to ultraviolet light, exposure to ozone and a combination thereof.

6. The process according to claim 1, wherein the treatment comprises, in the following sequence, (1) the reverse osmosis membrane purification, (2) a treatment selected from the group consisting of exposure to ultraviolet right, exposure to ozone, contact with at least one adsorption resin, and any combination thereof, (3) optionally one or more other treatments.

7. The process according to claim 6, wherein the treatment comprises, in the following sequence, (1) the reverse osmosis membrane purification, (2) exposure to ultraviolet light, and (3) contact with at least one adsorption resin.

8. The process according to claim 1, wherein the other purification includes contact with at least one adsorption resin.

9. The process as claimed in claim 1 wherein said aqueous hydrogen peroxide solution has a TOC level after treatment of less than 1 mg/kg.

10. The process as claimed in claim 1 wherein said aqueous hydrogen peroxide solution has a TOC level after treatment of less than 0.01 mg/kg.

11. The process as claimed in claim 1 wherein said reverse osmosis membrane purification comprises passing said aqueous hydrogen peroxide solution though a reverse osmosis membrane made of a material selected from the group consisting of polyamides, polypiperazine amides, polyacrylonitriles and polysulfones.

12. The process as claimed in claim 1 wherein said aqueous hydrogen peroxide solution is passed though said reverse osmosis membrane at a flux of from 20-50 liters per hour per $m^2$ of membrane surface.

13. The process as claimed in claim 11 wherein said reverse osmosis membrane is made of polyamide.

14. The process as claimed in claim 11 wherein said reverse osmosis membrane is made of polypiperazine amide.

15. The process as claimed in claim 11 wherein said reverse osmosis membrane is made of polyacrylonitrile.

16. The process as claimed in claim 11 wherein said reverse osmosis membrane is made of polysulfone.

17. The process as claimed in claim 12 wherein said reverse osmosis membrane is made of polyamide.

18. The process as claimed in claim 12 wherein said reverse osmosis membrane is made of polypiperazine amide.

19. The process as claimed in claim 12 wherein said reverse osmosis membrane is made of polyacrylonitrile.

20. The process as claimed in claim 12 wherein said reverse osmosis membrane is made of polysulfone.

21. A process for the purification of an aqueous hydrogen peroxide solution comprising the treatment of an aqueous hydrogen peroxide solution first with a reverse osmosis membrane purification, and afterwards with at least one other purification selected from the group consisting of exposure to ultraviolet light, exposure to ozone, contact with at least one adsorption resin, and any combination thereof, wherein the other purification includes exposure to ozone.

* * * * *